(12) United States Patent
Post et al.

(10) Patent No.: US 12,315,183 B1
(45) Date of Patent: *May 27, 2025

(54) SYSTEM AND METHOD FOR DETECTING DEVIATIONS IN BUILDING STRUCTURES USING RECONSTRUCTED 3D MODELS

(71) Applicant: UIPCO, LLC, San Antonio, TX (US)

(72) Inventors: Nathan Lee Post, Rockport, TX (US); Carlos J P Chavez, San Antonio, TX (US); Deborah Janette Schulz, San Antonio, TX (US); Ashley Raine Philbrick, San Antonio, TX (US); Eric David Schroeder, San Antonio, TX (US); Gabriel Carlos Fernandez, San Antonio, TX (US); Snehal Desai, Richardson, TX (US); Rachel Elizabeth Csabi, Frisco, TX (US); Ruthie D. Lyle, Durham, NC (US); Courtney St. Martin, Duluth, GA (US)

(73) Assignee: United Services Automobile Association (USAA), San Antonio, TX (US)

( * ) Notice: Subject to any disclaimer, the term of this patent is extended or adjusted under 35 U.S.C. 154(b) by 84 days.

This patent is subject to a terminal disclaimer.

(21) Appl. No.: 18/313,828

(22) Filed: May 8, 2023

Related U.S. Application Data

(63) Continuation of application No. 17/027,816, filed on Sep. 22, 2020, now Pat. No. 11,769,268.

(60) Provisional application No. 62/907,830, filed on Sep. 30, 2019.

(51) Int. Cl.
*G06T 7/593* (2017.01)
*G06T 7/00* (2017.01)
*G06T 7/521* (2017.01)
*G06T 7/60* (2017.01)
(Continued)

(52) U.S. Cl.
CPC .............. *G06T 7/593* (2017.01); *G06T 7/521* (2017.01); *G06T 7/60* (2013.01); *G06T 7/97* (2017.01); *G06T 17/10* (2013.01); *G06T 19/006* (2013.01)

(58) Field of Classification Search
CPC .... G06T 7/593; G06T 7/521; G06T 7/60; G06T 7/97; G06T 17/10; G06T 19/006
See application file for complete search history.

(56) References Cited

U.S. PATENT DOCUMENTS

| | | | |
|---|---|---|---|
| 11,769,268 B1 * | 9/2023 | Post | G06T 7/593 382/154 |
| 2006/0111797 A1 | 5/2006 | Saito | |
| 2017/0147619 A1 | 5/2017 | Dow | |

OTHER PUBLICATIONS

Non-Final Office Action mailed Sep. 29, 2022 for U.S. Appl. No. 17/027,816.

(Continued)

*Primary Examiner* — Ayodeji O Ayotunde
(74) *Attorney, Agent, or Firm* — Plumsea Law Group, LLC (57) ABSTRACT

A system and method for detecting deviations in building structures over time is disclosed. The system and method use range images of buildings captured using range imaging cameras (for example, time-of-flight cameras) to construct 3D models with sufficient resolution to detect deviations in structures that may not be obvious from looking at only photographic images. The system can also use augmented reality to project parts of a 3D model over photographic images of a structure to facilitate easy inspection of the structure.

20 Claims, 9 Drawing Sheets

(51) Int. Cl.
*G06T 17/10* (2006.01)
*G06T 19/00* (2011.01)

(56) References Cited

OTHER PUBLICATIONS

Notice of Allowance mailed Feb. 7, 2023 for U.S. Appl. No. 17/027,816.

\* cited by examiner

SYSTEM AND METHOD FOR DETECTING DEVIATIONS IN BUILDING STRUCTURES USING RECONSTRUCTED 3D MODELS

CROSS-REFERENCE TO RELATED APPLICATIONS

This application is a Continuation of co-pending patent application Ser. No. 17/027,816, filed Sep. 22, 2020 and titled "System and Method for Detecting Deviations in Building Structures Using Reconstructed 3D Models" and claims the benefit of Provisional Patent Application No. 62/907,830 filed Sep. 30, 2019, and titled "System and Method for Detecting Deviations in Building Structures Using Reconstructed 3D Models". The disclosures of which are incorporated by reference herein in their entirety.

TECHNICAL FIELD

The present disclosure generally relates to structures, and in particular, to methods of detecting deviations in structures.

BACKGROUND

Buildings such as homes may undergo changes with time, as well as in response to environmental conditions such as flooding, rain, winds, earthquakes, and fires. For example, structural features such as walls, support columns, floors, roofs, and other structures may be deformed or otherwise damaged. Some types of damage may be obvious from a visual inspection and may be readily captured using photos. For example, if part of a roof has completely collapsed, this may be captured using a photograph that can be inspected by a remote user such as a claims adjuster. However, some changes in these structures may be more subtle. These changes may not be obvious from a quick visual inspection. Likewise, when sending photographs of any potential damage to an insurance adjuster, some structural deviations may not be obvious from 2D photographs, since perspective and poor lighting can make it difficult to spot moderate damage. This may result in inaccuracies in claim assessments, as well as in assessments of the overall value of the house.

There is a need in the art for a system and method that addresses the shortcomings discussed above.

SUMMARY

In one aspect, a method of detecting deviations in a building structure over time includes steps of capturing a first set of range images of the building structure using a range imaging camera, using the first set of range images of the building structure to create a first 3D model of the building structure, and storing the first 3D model. The method further includes a step of capturing a second set of range images of the building structure, where the second set of range images are taken at a later time than the first set of range images. The method also includes steps of using the second set of range images of the building structure to create a second 3D model of the building structure, and automatically detecting at least one deviation between the first 3D model and the second 3D model.

In another aspect, a method of detecting deviations in a building structure over time includes steps of capturing a first set of range images of the building structure using a range imaging camera, using the first set of range images of the building structure to create a 3D model of the building structure, and storing the 3D model. The method also includes a step of capturing a photographic image of the building structure, where the photographic image of the building structure is taken at a later time than the first set of range images. The method also includes a step of superimposing a portion of the 3D model over the photographic image of the building structure.

In another aspect, a method of detecting deviations in a building structure over time includes using a smartphone to capture a first set of range images of the building structure with a range imaging camera incorporated into the smartphone, and sending the first set of range images to a computing system, where the computing system runs a 3D modeling application. The method also includes steps of using the 3D modeling application on the computing system to construct a first 3D model of the building structure from the first set of range images, using the smartphone to capture a second set of range images of the building structure with the range imaging camera incorporated into the smartphone, sending the second set of range images to the computing system, using the 3D modeling application on the computing system to construct a second 3D model of the building structure from the second set of range images, and using a model comparison application to automatically detect at least one deviation between the first 3D model and the second 3D model.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF THE EMBODIMENTS

The embodiments include a system and method for collecting accurate range imaging data about a building structure, and using the ranging imaging data to build a 3D model of the structure with sufficient precision to detect deviations in the structure over time. As used herein, the term "building structure" can refer to any kind of building, such as a home, or other residential building, a commercial building or any other related structures. In some cases, the term building structure can refer to a specific portion of a building, such as a room, wall, or other feature.

The system comprises a computing system and a range imaging camera. The range imagining camera can be used to capture range imaging data (such as range images). This data is sent to a computing system that includes a 3D modeling system. The 3D modeling system is used to create a 3D model of a structure using the received range imaging data. An initial 3D model of a structure is created and stored. At a later time, additional range imaging data for a structure is captured, for example, after a recent event such as a hurricane or earthquake. This additional range imaging data is used to create a new 3D model. The new 3D model can be compared with the initial 3D model to detect possible deviations in the structure. In some cases, the 3D models may be sufficiently accurate to detect changes that would not be easily detected from visual inspection and/or using photographic images.

The embodiments facilitate improved detection of deviations in structures that are otherwise not detectable using other techniques. This allows for improved estimates of insurance claims. This also helps improve the safety of a structure by ensuring that even moderate damage is identified and addressed after events such as hurricanes, earthquakes, and/or as the structure ages over time.

Figure 1:
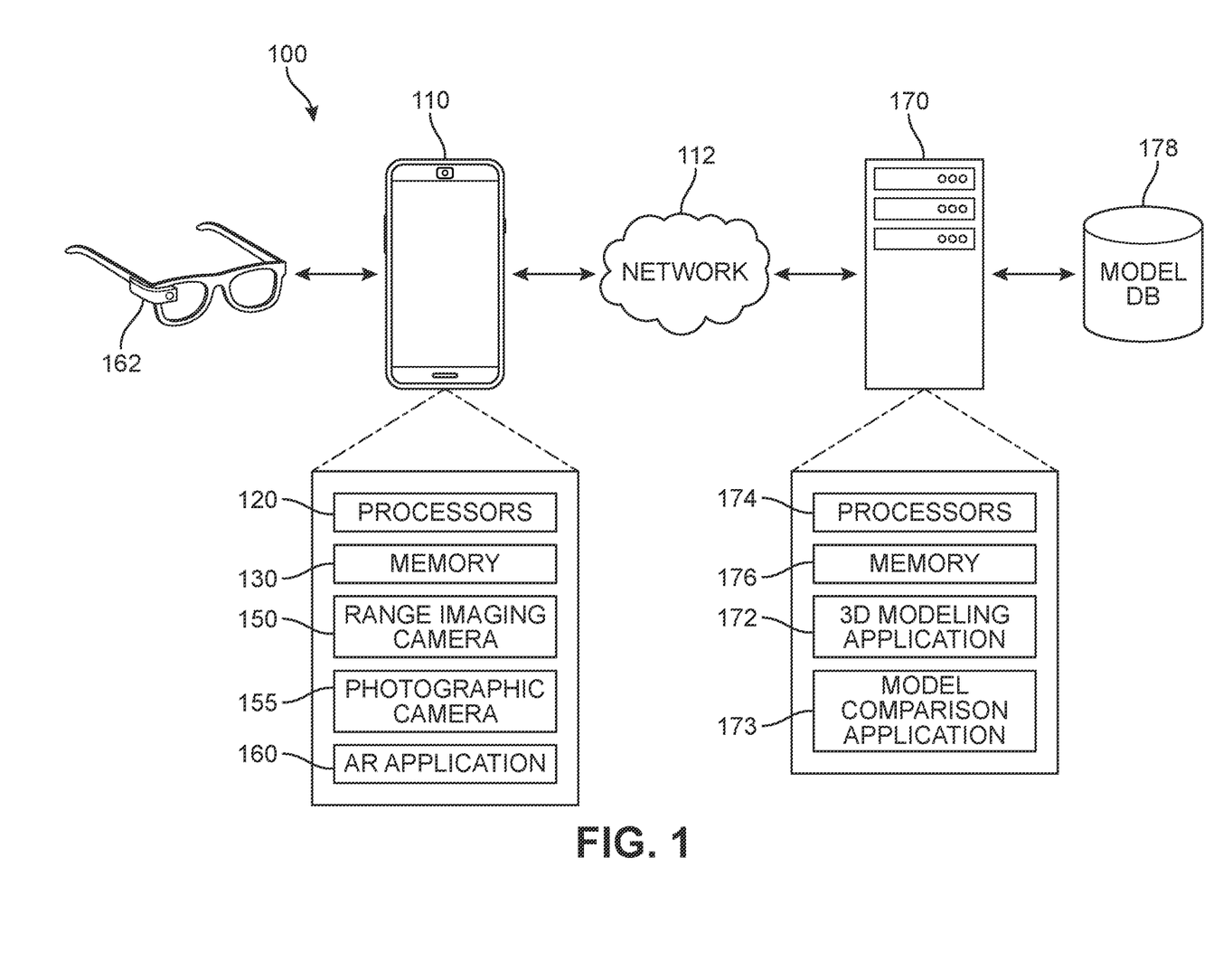
FIG. 1 is a schematic view of a damage detection system, according to an embodiment.

FIG. 1 is a schematic view of a damage detection system 100. Damage detection system 100 comprises various components that can be used to capture information about building structures, generate 3D models of those structures, and detect deviations (including damage) in the structures over time. This system may comprise a user device 110. Exemplary devices may include, but are not limited to: mobile phones, and tablets.

User device 110 may include one or more processors 120 and memory 130. Memory 130 may comprise a non-transitory computer readable medium. Instructions stored within memory 130 may be executed by the one or more processors 120.

User device 110 may include provisions for capturing information about a building structure. In some embodiments, user device 110 includes provisions for capturing visual information about a building structure. In one embodiment, user device 110 includes a range imaging camera 150, or simply a range camera. Range cameras include any type of device that can capture range information or range images corresponding to an object in the viewing area of the camera. As used herein, "range images" provide a 2D array of values indicating a depth (or distance measurement).

Exemplary range imaging devices may include structured-light 3D scanners and time-of-flight cameras. In one embodiment, user device 110 could be a smartphone with a built-in time-of-flight camera. Using a time-of-flight camera, user device 110 can capture range images of a scene that can be used to build a 3D model of objects in the scene, such as building structures.

User device 110 may also incorporate provisions for displaying models of building structures to a user. In some embodiments, user device 110 includes augmented reality (AR) application 160, which can be used to superimpose a model of a building structure onto a scene captured by a photographic camera 155. In contrast to range imaging camera 150, photographic camera 155 comprises sensors for capturing lighting and/or color information that can be used to build a 2D photographic image of a scene.

In some embodiments, augmented reality elements could be projected onto a display of user device 110. In other embodiments, a separate AR device, such as AR goggles 162, could be used to display AR information for a user.

System 100 may further include a computing system that facilitates creating and analyzing 3D models of building structures based on ranging image information. In the embodiment of FIG. 1, system 100 includes a computing system 170 (which may comprise one or more servers) that runs a 3D modeling application 172. In some embodiments, computing system 170 may further include a model comparison application 173.

Moreover, computing system 170 may also include processors 174 and memory 176 to facilitate running application 172 and/or application 173. Additionally, models or other information could be stored in a separate model database 178.

In some embodiments, user device 110 could communicate with computing system 170 over a network 112. Generally, network 112 could comprise any kind of network. Network 212 could include a Wide Area Network (WAN), a Local Area Network (LAN), Wi-Fi network, Bluetooth or other Personal Area Network, cellular network, as well as other kinds of networks. It may be appreciated that different devices could communicate using different networks and/or communication protocols.

In other embodiments, a 3D modeling application could be configured to run on user device 110, rather than on a separate system such as a server. In still other embodiments, some components of a 3D modeling system could be run on user device 110, while other components could be run on a server.

In other embodiments, a range imaging camera could be a separate device from user device 110. In some cases, for example, range imaging camera could be a stand-alone camera. In still other cases, a range imaging camera could be built into an AR enabled device such as AR goggles. In such an embodiment, the AR goggles with an integrated range imaging camera could be used without a separate user device such as a mobile phone. In particular, the AR goggles could communicate with a computing system over a network in order to have imaging data processed into a 3D model.

Figure 2:
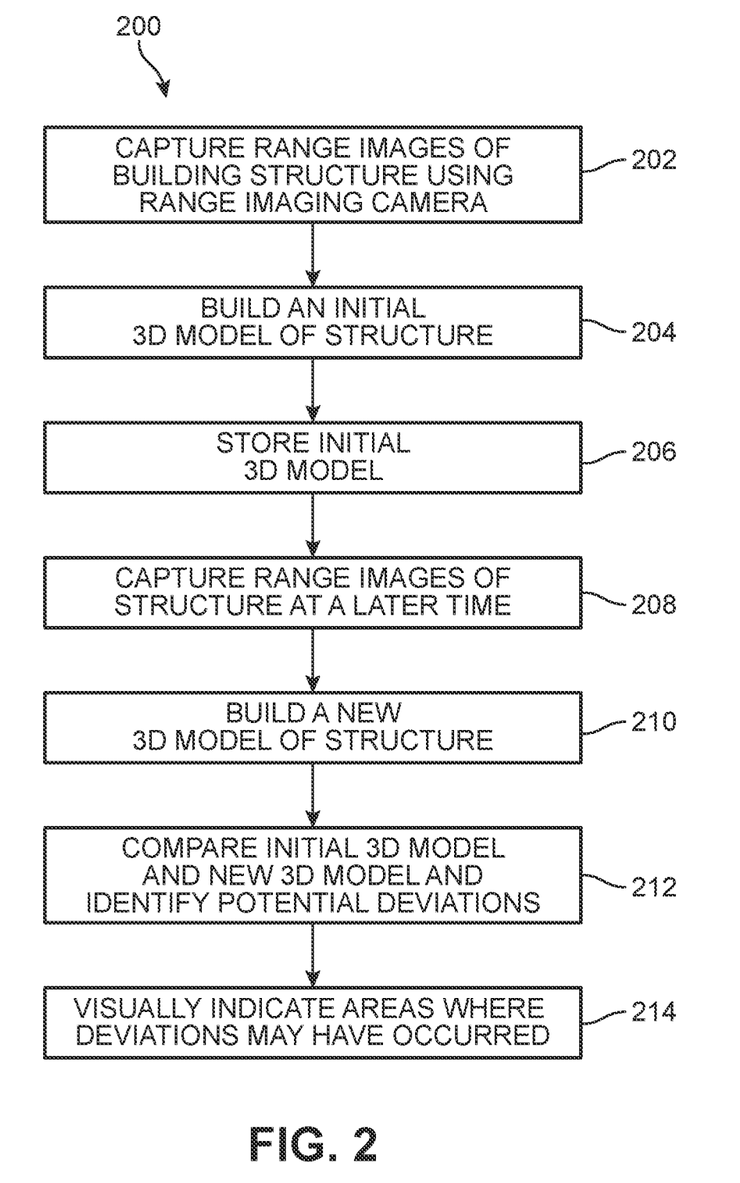
FIG. 2 is a schematic view of a process for detecting damage or deviations in a building structure using the system of FIG. 1, according to an embodiment.

FIG. 2 is a schematic view of a process 200 for using a damage detection system to determine damage (or other deviations) to a building structure over time. It may be appreciated that the steps shown in FIG. 2 may be performed by one or more components of a damage detection system. Specifically, some steps could be performed by a user device enabled with a range imaging camera, while other steps could be performed by a (possibly) separate computing system running 3D modeling software.

Figure 3:
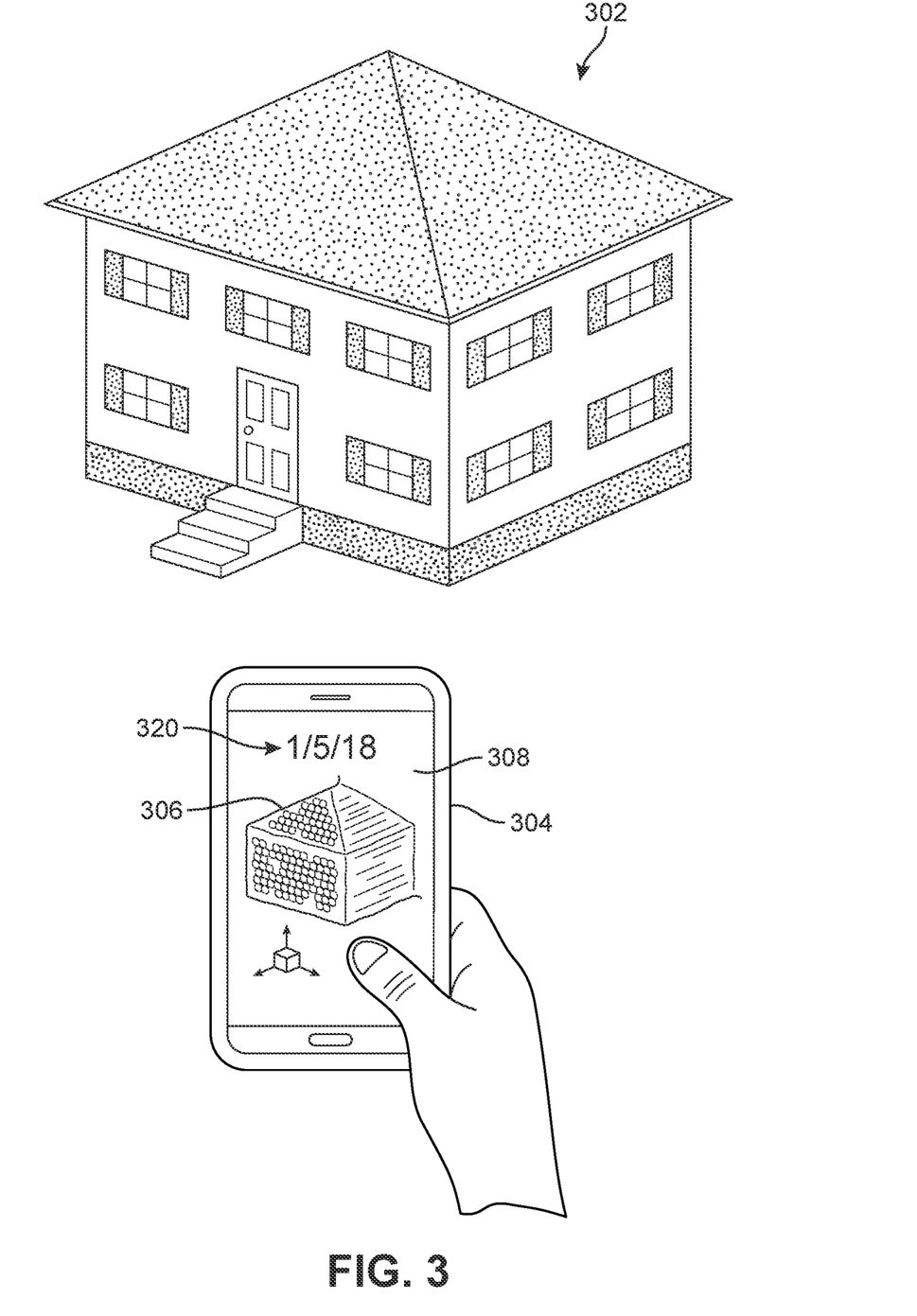
FIG. 3 is a schematic view of a step of capturing range images of a building, according to an embodiment.

Starting in step 202, a range imaging camera (such as camera 150) could be used to capture range information about a building structure. As an example, FIG. 3 depicts a scenario in which range information about a home 302 is captured using smartphone 304. Specifically, a range image 306 is captured and shown on display 308 of smartphone 304. A range image may generally comprise a 2D array of different depths or distance values. Such values could be displayed in a 2D plot where color indicates different depths. Alternatively, the depth values can be plotted to give a 3D surface. For purposes of illustration, such a 3D surface is depicted schematically in FIG. 3.

In other cases, range information may not be displayed even as it is captured. Moreover, in some cases, range information (such as range images) may be captured along with color image data (that is, image data containing a 2D array of color values) and embedded in a data structure that contains both a 2D visual image of an object and associated range information.

Figure 4:
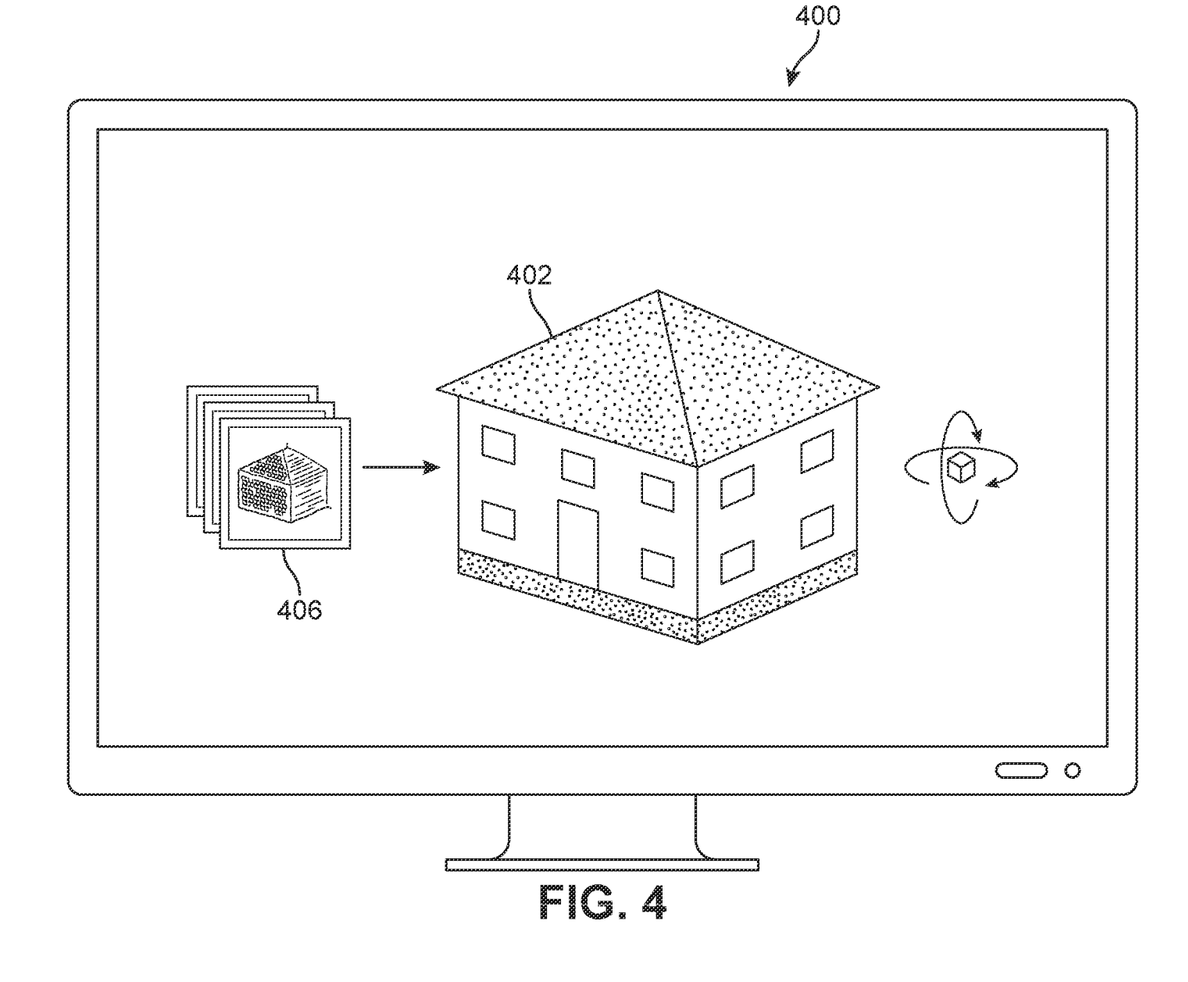
FIG. 4 is a schematic view of a 3D model that has been reconstructed from range images of the building shown in FIG. 3, according to an embodiment.

In step 204, the range information captured in a range image can be used to build a 3D model of the building structure captured in step 202. For example, FIG. 4 depicts a schematic view of a scenario in which range information for home 302 (see FIG. 3) is used to construct a 3D model 402. Specifically, multiple range images 406 are used as inputs to a model construction process. For purposes of illustration, model 402 is displayed on a monitor of a computing system 400.

In some cases, the range information can be sent from a user device to a remote computing system over a network. In other cases, the same device can be used to capture range information and to build a 3D model. The process of building a 3D model from range information can include steps of range image registration and reconstruction. During range image registration, multiple images of an object from different viewing angles may be collected and transformed into a common 3D coordinate system so that the range information for an entire object can be determined. During reconstruction, the full set of range information can be used to build a 3D model. This can include building a 3D surface of an object from a cloud of range points, or by merging locally constructed triangular meshes. The embodiments can use any known methods for registering (or aligning) range information from multiple images/files. The embodiments can also use any known methods for reconstructing 3D surfaces from range information.

In step 206, the initial 3D model of a building structure can be stored for later retrieval. In some cases, the model could be stored in a database. For example, models could be stored in database 178 shown in FIG. 1.

Figure 5:
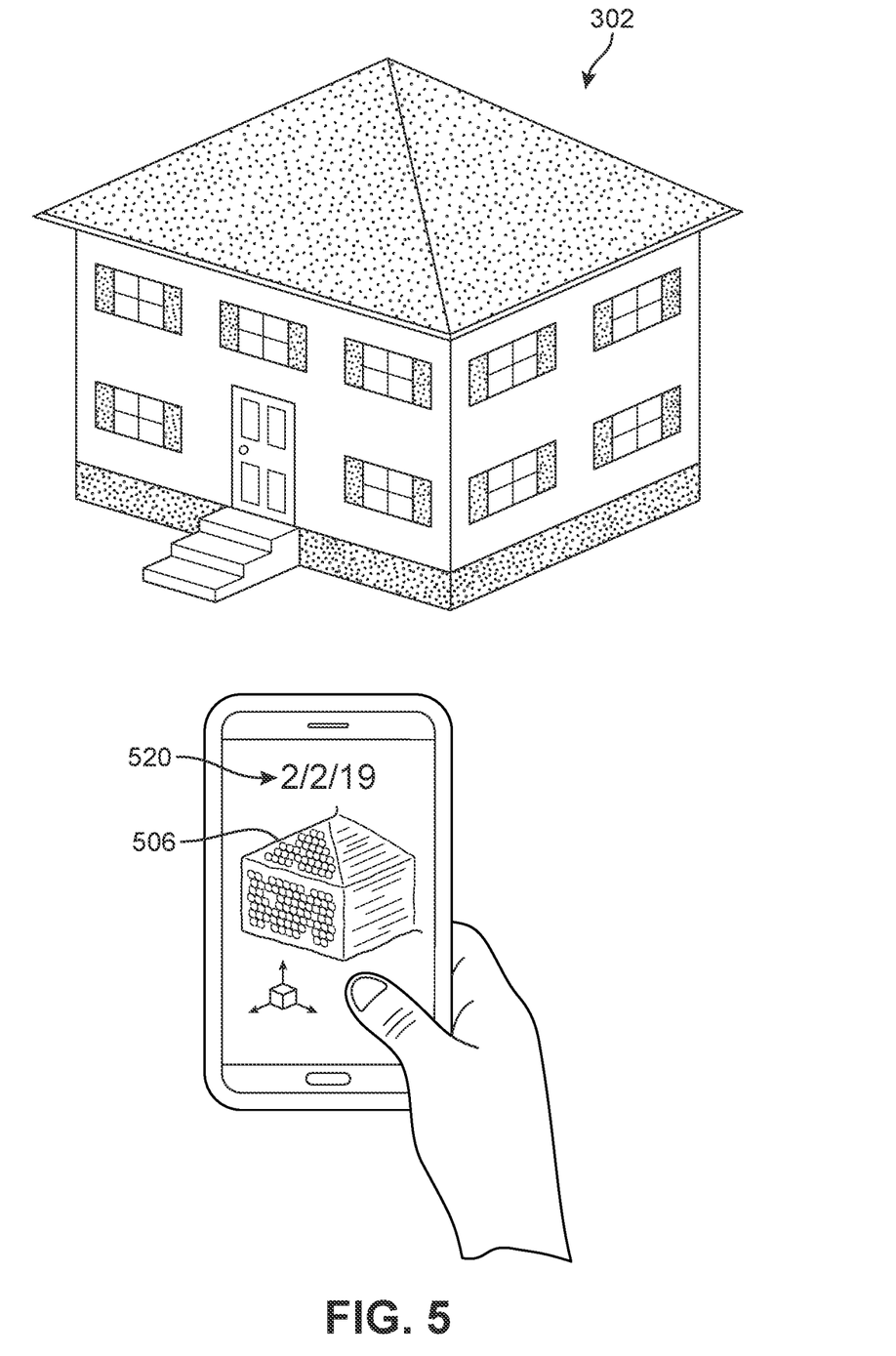
FIG. 5 is a schematic view of a step of capturing range images of the building in FIG. 3 at a later time, according to an embodiment

Because one utility of the present system is determining deviations (or damage) to building structures over time, the exemplary method includes capturing range information for the same structure at a later time. This is accomplished in step 208, using a similar process to that described for step 202. For example, FIG. 5 shows a scenario where a user is taking an image of home 302 at a later time. Specifically, comparing date stamp 320 in FIG. 3 and date stamp 520 in FIG. 5, it can be seen that the first ranging image 306 is taken at an earlier date than the second ranging image 506 of FIG. 5.

In step 210, the range information taken at a later time in step 208 can be used to build a new (or updated) model of the building structure in step 210. This new 3D model may optionally be stored in memory.

In step 212, a system can compare the initial 3D model and the new 3D model. Such a comparison can be made automatically or manually. In some cases, a computing system may include software that automatically compares new 3D models of a building structure with previous 3D models of the same building structure. The system could perform predetermined comparisons to check for deviations in different portions of the models. In one embodiment, the model comparison application 173 (see FIG. 1) may be used to analyze the differences between two 3D models. For example, the model comparison application could compare the dimensions of particular structural parts (such as walls, support columns, doors, windows, etc.) and look for possible deviations. Also, the model comparison application could compare the relative orientations of structural parts, including, for example, the angles between walls and floors, walls and ceilings, and/or between parts of a building and a ground surface. In other cases, the 3D models could be viewed by a user and manually compared.

Figure 6:
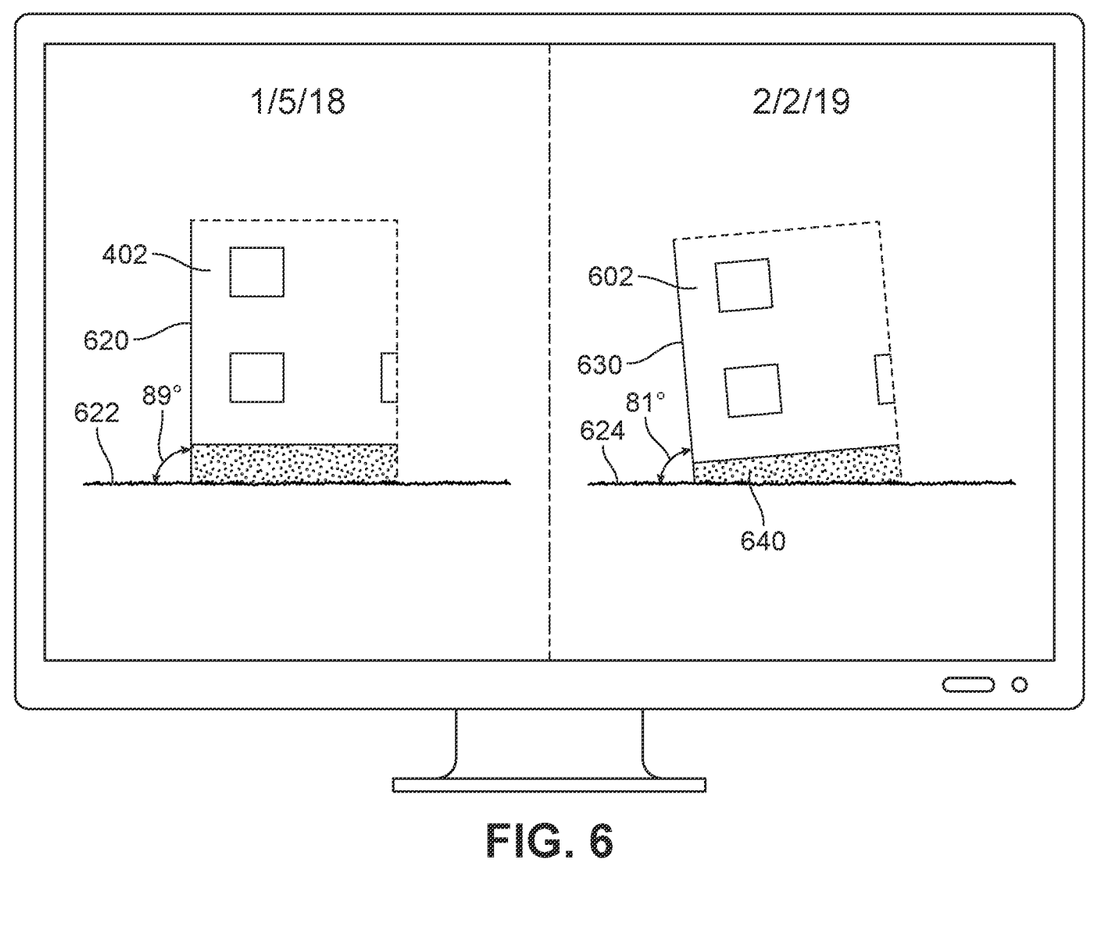
FIG. 6 is a schematic view of a step of comparing an initial 3D model and an updated 3D model of a building structure, according to an embodiment.

For purposes of illustration, FIG. 6 depicts a situation in which two 3D models are visually compared using computing system 600. Specifically, the initial model 402 of a building structure is compared to a second model 602 of the same building structure. In this case, second model 602 corresponds to a state of the building structure at a later time. As seen in FIG. 6, second model 602 is seen to be slanted slightly with respect to a reference ground surface 624, as compared to first model 402.

This deviation may be made more precise using the modeling software which is able to calculate substantially precise dimensions for parts of a structure, and also determine angular measurements between different parts of surfaces. In this case, a sidewall 620 of first model 402 makes an angle of approximately 89 degrees with ground surface 622. In contrast, a sidewall 630 (which represents the same structural wall as sidewall 620) in second model 602 makes an angle of approximately 81 degrees with ground surface 624. This suggests that the foundation 640 on one side of the building structure may be sinking or otherwise stressed/compressed.

For purposes of illustration, the slanting of sidewall 630 in FIG. 6 is shown in an exaggerated manner. It may be appreciated, however, that the present system may be useful for detecting slight deviations that are not noticeable upon quick visual inspection and/or that are not perceptible from photographic images. In these cases, the utility of a system that can generate models of a building structure with sufficiently high precision can be clearly seen.

Figure 7:
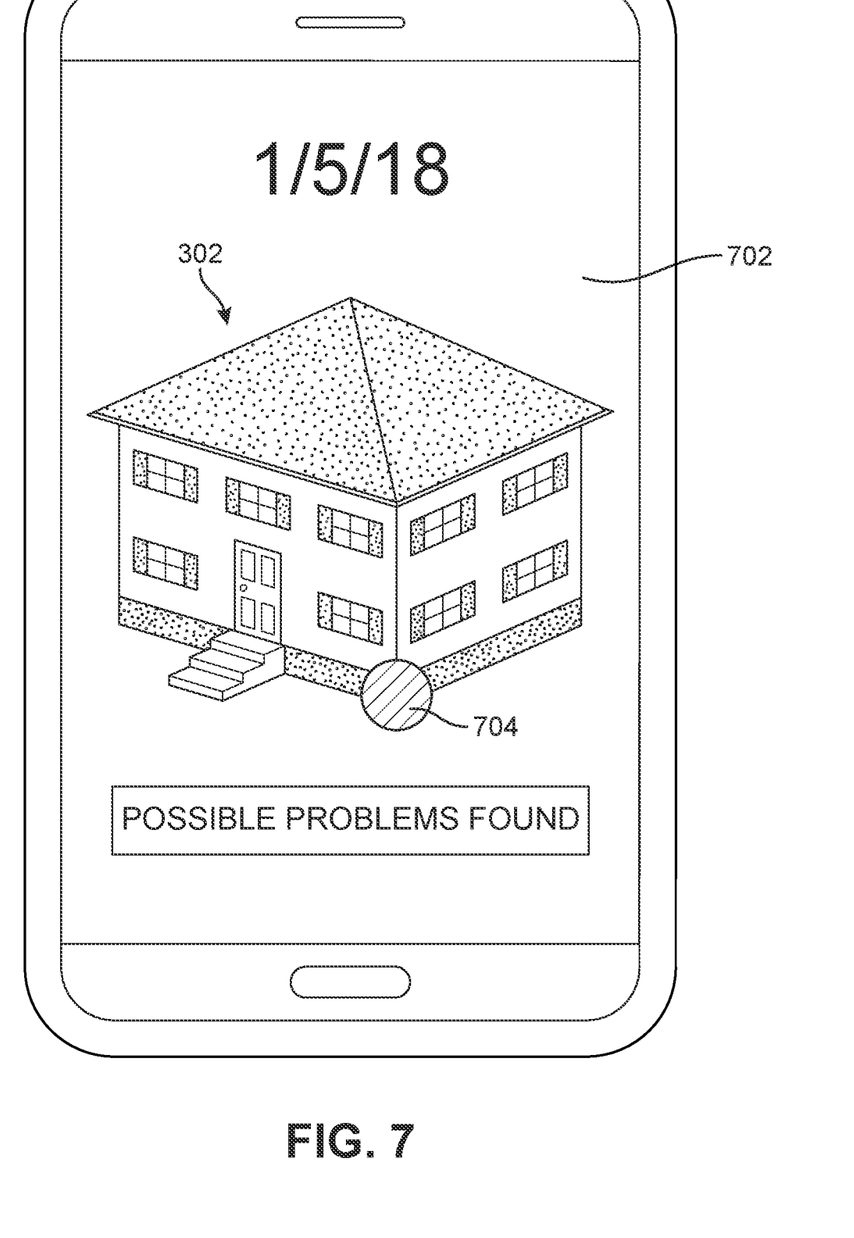
FIG. 7 is a schematic view of a process for indicating potential problems for a user, according to an embodiment.

In step 214, a system may use visually indicate areas where deviation (or damage) may have occurred. For example, a system could send an image to a user's device highlighting the location(s) of deviations that are suggestive of possible damage. Such an example is shown schematically in FIG. 7. In this case, a user may see an image 702 of home 302 with the potentially problematic area 704 highlighted. This visual indicator may alert a user that further inspection of this part of the building structure is needed. In some cases, this information could be further used to make more accurate predictions about the value of a home for insurance or resale purposes.

Figure 8:
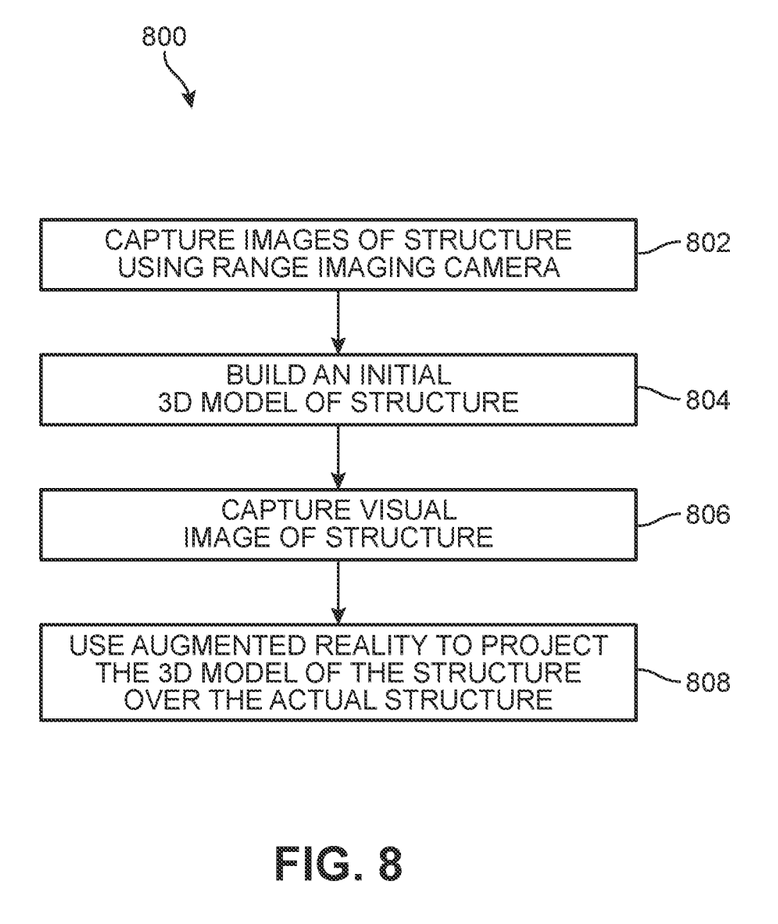
FIG. 8 is a schematic view of a step of displaying augmented reality elements over an image of a building, according to an embodiment.

FIG. 8 is a schematic view of another process 800 for using a damage detection system to determine damage (or other deviations) to a building structure over time. In this case, rather than building two 3D models at different times and comparing the models directly, the system utilizes augmented reality to superimpose a baseline 3D model onto a live view of a home. This may facilitate quick and accurate inspections of a building structure.

Starting in step 802, images of a building structure may be captured using range imaging cameras. This step may proceed in a similar manner to step 202 described above. Next, in step 804, an initial or baseline 3D model of the building structure may be constructed using range information acquired in step 802. This step may proceed in a similar manner to step 204 described above.

In contrast to the previous method, damage detection is accomplished by superimposing the model constructed in step 804 over visual images of a structure (possibly in real time), so that a user can manually look for any possible deviations. To accomplish this, a visual image of a building structure may be captured in step 806. This visual image includes an array of data with color values and can be displayed as a "picture" or photographic image to a user. Next, in step 808, the system may use augmented reality to project (or superimpose) the 3D model of building structure over the image of the building structure. More specifically, the 3D model may be registered to the image so that AR elements representing portions of the model can be projected onto corresponding portions of the building shown in an image.

Figure 9:
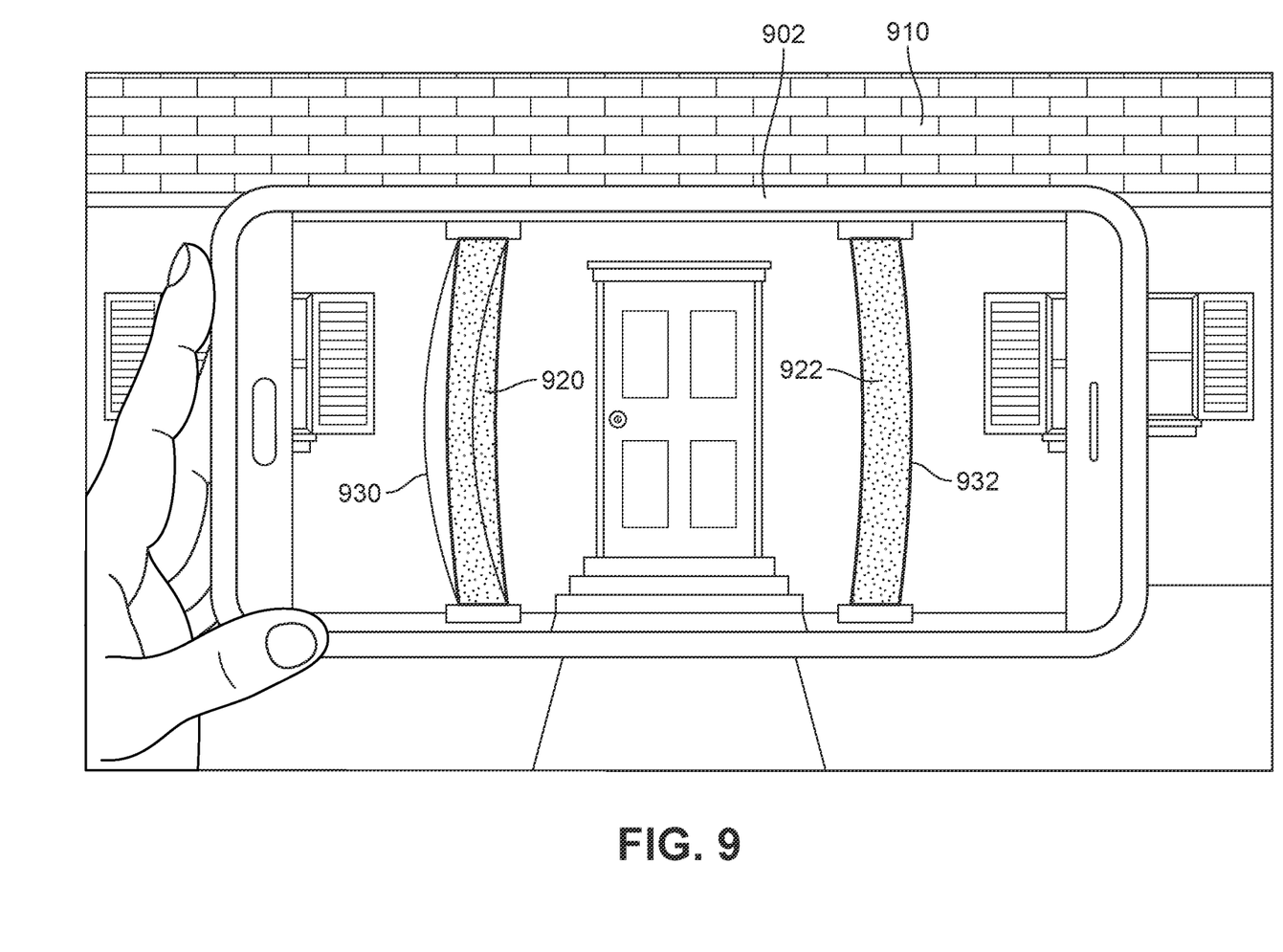
FIG. 9 is a schematic view of a process for using augmented reality to display a portion of a 3D model over an image of a building, according to an embodiment.

FIG. 9 depicts a schematic view of step 806 and step 808 described above. Here, a smartphone 902 is used to capture a live image of a home 910. A 3D model of the home, which has been previously constructed, can be used to project AR elements corresponding to particular portions of the building. In this case, a first AR column 920 corresponding to a first model column is projected over a first structural column 930 and a second AR column 922 corresponding to a second model column is projected over a second structural column 932. By superimposing these AR elements representing an earlier state of the building, a user can easily identify deviations that have occurred in the first structural column 930 over time. In this particular example, both first structural column 930 and second structural column 932 had some bowing when the initial model was constructed at an earlier time. This earlier state of the columns is indicated visually by the AR columns (that is, first AR column 920 and second AR column 922), which indicate some bowing. But whereas second structural column 932 has not bowed any further (indicated by its complete alignment with second AR column 922), first structural column 930 appears to have undergone additional bowing. This additional bowing can be detected by the misalignment between first AR column 920 and first structural column 930.

For purposes of illustration, the embodiments of FIG. 9 depict bowing that has been exaggerated. It may be appreciated, however, that the present system may be useful for detecting slight deviations that are not noticeable upon quick visual inspection and/or that are not perceptible from photographic images. In these cases, the utility of a system that can generate models of a building structure with sufficiently high precision can be clearly seen.

It may be appreciated from the example shown in FIG. 9 that the exemplary system and process can be used to track not only the appearance of new deviations, but also the changes in those deviations over time. This allows a user to determine when a given deviation is substantial enough to warrant further investigation.

The ability of a system to detect deviations over time may be related to the overall resolution and accuracy of the range images. The resolution and accuracy of the range images will contribute to the resolution and accuracy of the corresponding 3D models. In some embodiments, 3D models may be accurate to within a range of 0.1 to 5 centimeters, for example. In an exemplary case where a model has an accuracy of 5 centimeters, the system could detect deviations where a structure changes (rotates, bows, leans, sinks, or compresses, for example) by at least 5 centimeters. Depending on the location of the structure and background lighting, such deviations may not be readily detectable visually either in person or using photographs.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smartphones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of detecting deviations in a building structure over time, comprising:
    capturing a set of range images of the building structure using a range imaging camera;
    using range information from the set of range images to determine an entire building structure range information;
    using the set of range images and the entire building structure range information to create a 3D model of the building structure;
    storing the 3D model;
    using a photographic camera to capture a visual image of the building structure, wherein the visual image is taken at a later time than the set of range images;
    using an augmented reality application to project the 3D model over the visual image;
    registering the 3D model to the visual image so that AR elements representing portions of the 3D model are projected on corresponding portions of the building structure in the visual image; and
    using the projection of the 3D model over the visual image to detect at least one deviation that occurred in the building structure over time.

2. The method of claim 1, wherein using the photographic camera to capture the live image comprises using a mobile computing device containing the photographic camera to capture the live image of the building structure.

3. The method of claim 2, wherein the mobile computing device comprises a smartphone.

4. The method of claim 2, wherein capturing the set of range images of the building structure using the range imaging camera further comprise using the range imaging camera in the mobile computing device.

5. The method of claim 1, wherein using an augmented reality application further comprises using an augmented reality application running on a smartphone.

6. The method of claim 1, wherein the method further comprises displaying the visual image as a photographic image to a user of the augmented reality application.

7. The method of claim 1, wherein using the projection of the 3D model over the visual image comprises manually looking at the projection of the 3D model over the visual image to identify deviations that have occurred over time.

8. The method of claim 1, wherein the AR elements represent an earlier state of the building.

9. The method of claim 1, wherein the visual image comprises a 2D array of color values.

10. The method of claim 1, wherein the range imaging camera comprise a time-of-flight camera.

11. The method of claim 1, wherein each range image comprises a 2D array of depth measurements.

12. The method of claim 1, wherein the building structure comprises a house.

13. The method of claim 1, wherein the building structure comprises a commercial building.

14. A method of detecting deviations in a building structure over time, comprising:
    using a mobile computing device to capture a set of range images of the building structure using a range imaging camera in the mobile computing device;
    using range information from the set of range images to determine an entire building structure range information;
    using the set of range images and the entire building structure range information to create a 3D model of the building structure;
    storing the 3D model;
    using a photographic camera in the mobile computing device to capture a visual image of the building structure, wherein the visual image is taken at a later time than the set of range images;
    using an augmented reality application running on the mobile computing device to project the 3D model over the visual image on a screen of the mobile computing device;
    registering the 3D model to the visual image so that AR elements representing portions of the 3D model are projected on corresponding portions of the building structure in the visual image; and
    using the projection of the 3D model over the visual image to detect at least one deviation that occurred in the building structure over time.

15. The method of claim 14, wherein the mobile computing device comprises a smartphone.

16. The method of claim 14, wherein using the set of range images and the entire building structure range information to create the 3D model further comprises using a 3D modeling application to create the 3D model.

17. The method of claim 14, wherein the method further comprises running the 3D modeling application on the mobile computing device.

18. The method of claim 16, wherein the 3D modeling application comprises a module for registering range image data and a module for reconstructing surfaces from range image data.

19. The method of claim 14, wherein using the projection of the 3D model over the visual image comprises manually looking at the projection of the 3D model over the visual image to identify deviations that have occurred over time.

20. The method of claim 14, wherein the AR elements represent an earlier state of the building.

* * * * *